(12) United States Patent
Cheng

(10) Patent No.: US 7,076,581 B2
(45) Date of Patent: Jul. 11, 2006

(54) COMPUTER FOR RECEIVING A REMOVABLE DATA STORAGE DEVICE

(75) Inventor: Shyong Chia Cheng, Taipei (TW)

(73) Assignee: First International Computer, Inc., Taipei (TW)

( * ) Notice: Subject to any disclaimer, the term of this patent is extended or adjusted under 35 U.S.C. 154(b) by 370 days.

(21) Appl. No.: 10/386,550

(22) Filed: Mar. 13, 2003

(65) Prior Publication Data

US 2004/0181623 A1    Sep. 16, 2004

(51) Int. Cl.
*G06F 13/12* (2006.01)
*H01R 13/62* (2006.01)
*H05K 7/18* (2006.01)

(52) U.S. Cl. .......................... 710/74; 710/62; 710/63; 710/64; 710/72; 710/73; 439/159; 439/160; 361/685; 361/754; 361/798

(58) Field of Classification Search .................. 312/9.4, 312/9.11, 9.13, 9.15, 9.16, 9.19, 9.28, 9.29, 312/9.39; 439/159, 160; 361/685, 754, 361/798; 360/96.5, 96.6; 710/62–64, 72–74
See application file for complete search history.

(56) References Cited

U.S. PATENT DOCUMENTS

| | | | | |
|---|---|---|---|---|
| 4,623,945 A | * | 11/1986 | Deutsch et al. | 360/93 |
| 5,019,928 A | * | 5/1991 | Kunze | 360/96.5 |
| 5,634,805 A | * | 6/1997 | Saito et al. | 439/159 |
| 5,980,284 A | * | 11/1999 | Ho et al. | 439/159 |
| 6,017,231 A | * | 1/2000 | Yoshitsugu et al. | 439/159 |
| 6,379,167 B1 | * | 4/2002 | Zhang et al. | 439/157 |
| 6,619,971 B1 | * | 9/2003 | Chen | 439/159 |
| 6,688,521 B1 | * | 2/2004 | Cheng | 235/451 |
| 6,705,878 B1 | * | 3/2004 | Liang | 439/76.1 |
| 6,776,345 B1 | * | 8/2004 | Liang | 235/486 |
| 6,814,597 B1 | * | 11/2004 | Kao | 439/159 |
| 6,867,979 B1 | * | 3/2005 | Ting | 361/727 |
| 2003/0178486 A1 | * | 9/2003 | Teng et al. | 235/441 |

* cited by examiner

*Primary Examiner*—Tanh Q. Nguyen
(74) *Attorney, Agent, or Firm*—Troxell Law Office, PLLC

(57) ABSTRACT

The present invention provides a computer for receiving a removable data storage device comprising a case having an internal motherboard with a CPU mounted thereon; at least one substantially rectangular opening on the case; at least one slot each provided within the opening for communicating therewith; and a USB port provided at a bottom of the slot opposite to the opening for being electrically connected to the motherboard; wherein the data storage device is insertable into the slot via the opening for connecting an I/O port of the micro drive and the USB port together. By utilizing this, the CPU on the motherboard is able to read data from the micro drive or write data into the micro drive via the coupled USB port and I/O port.

2 Claims, 4 Drawing Sheets

COMPUTER FOR RECEIVING A REMOVABLE DATA STORAGE DEVICE

FIELD OF THE INVENTION

The present invention relates to removable data storage devices of computer and more particularly to a computer for receiving a removable data storage device (e.g., micro drive).

BACKGROUND OF THE INVENTION

This is an information age. More information related products having embedded powerful microprocessors are available in the market continuously. These products not only bring a lot of convenience to people but also are closely related to our daily life. Applications of information related products such as computer peripherals (e.g., data storage devices) are even wider as information technology advances faster. Also, people have an increasing demand to the quality of the information products. Thus, an indicator about whether information technology of one country is more advanced than other countries can be decided based on whether computer peripherals produced by that country can provide a more convenient service, a more effective operation, and more ergonomic features.

As to the design of computer (e.g., notebook computer or desktop computer) with respect to weight and size pursued by computer manufacturers, not only compactness, light-weight, and slimness but also all-in-one are development focuses. Accordingly, the more advance of computers the more advance of its peripherals will be. It is understood that the peripheral market is very competitive. Also, there are a variety of models of a single peripheral produced by different manufacturers available in the market. Thus, a great burden is borne on peripheral manufacturers for selling their products. In an opposite view, vast consumers will be benefited due to the increase of product selection chances. It is appreciated by most consumers that they can buy a high quality, ergonomic, and all-in-one peripheral with a fair price.

In view of the above, for winning in the competitive market of information products a peripheral produced by a peripheral manufacturer must be multi-functional and ergonomic (e.g., a data storage device being portable, compact, and large in capacity) in addition to fair price. A micro drive is an information product thus developed by the above concept. The micro drive has the advantages of, for example, (1) plug and play (i.e., useable in any place, easy installation and use, and no driver required), (2) compactness, light-weight, no additional equipment, and no external power for activation, (3) least amount of power consumption and off-but-ready or power saving mode supported, (4) write protect for data safety, (5) complied with USB (Universal Serial Bus) 1.1 specifications, (6) many operating systems (e.g., Mac OS 8.6, Windows 2000, Windows ME and Windows XP, Windows 98, and Windows 98SE) supported, (7) different memory spaces (e.g., 8MB, 16MB, 32MB, 64MB, 128MB, 256MB, 512MB . . . 1GB, etc.) available, and (8) no USB port required for leaving one USB port available for a peripheral (e.g., mouse, printer, etc.) coupled to the USB port while operating the micro drive.

The availability of micro drives effects a more convenient storage and portability of data. However, commercially available micro drives suffered from several disadvantages. For example, the micro drive is connected to a USB port of computer by insertion. Such configuration is not what the computer manufacturer expects because the USB port is designed to connect to one of various peripherals such as mouse, printer, scanner, keyboard, and joystick rather than the micro drive. In this regard, the USB port is typically mounted on a surface of computer case for ease of coupling to the peripheral. It is found that the micro drive is projected from the computer as the micro drive is connected to the USB port by insertion. This can detract the computer's external appearance. Moreover, a user or another person passing the computer may contact the micro drive unintentionally, resulting in a drop of the micro drive, a damage of the micro drive, or an interruption of data being transferred resulting in data loss or error.

Thus, it is desirable among peripheral manufacturers and vast consumers to provide a computer having a slot with the USB port provided in the bottom of the slot for receiving and connecting to a removable data storage device in order to overcome the above drawbacks of the prior art.

SUMMARY OF THE INVENTION

A primary object of the present invention is to provide a computer for receiving a removable data storage device (e.g., micro drive) so as to effect a more convenient storage and portability of data and enable a computer manufacture to overtake others in the competitive market by making the same. By utilizing this, the above drawbacks of the prior art can be overcome. These drawbacks are that the micro drive is connected to a USB port on a computer case by insertion. The micro drive is projected from the computer case. This can detract the computer's external appearance. Moreover, a user or another person passing the computer may contact the micro drive unintentionally, resulting in a drop of the micro drive, a damage of the micro drive, or an interruption of data being transferred resulting in data loss or error.

One object of the present invention is to increase data storage space of a computer by connecting a compact, removable, portable data storage device (e.g., micro drive) to a USB port of the computer without modifying the hardware of the computer or adding additional components in the computer. Also, the micro drive is not projected from the computer after inserting into a slot of the computer.

To achieve the above and other objects, the present invention provides a computer for receiving a removable data storage device comprising a case including an internal motherboard and a CPU mounted on the motherboard; at least one substantially rectangular opening on the case; at least one slot each provided within the opening for communicating therewith; and a USB port provided at a bottom of the slot opposite to the opening, the USB port being electrically connected to the motherboard; wherein the data storage device is insertable into the slot via the opening for connecting an I/O port of the micro drive and the USB port together. By utilizing this, the CPU on the motherboard is able to read data from the micro drive or write data into the micro drive via the coupled USB port and I/O port. It is anticipated that the micro drives may replace the widely used 3.5 inch floppy disks in a near future because the micro drives have the advantages of compactness, portability, and large memory space.

The above and other objects, features and advantages of the present invention will become apparent from the following detailed description taken with the accompanying drawings.

DETAILED DESCRIPTION OF THE PREFERRED EMBODIMENTS

Figure 1:
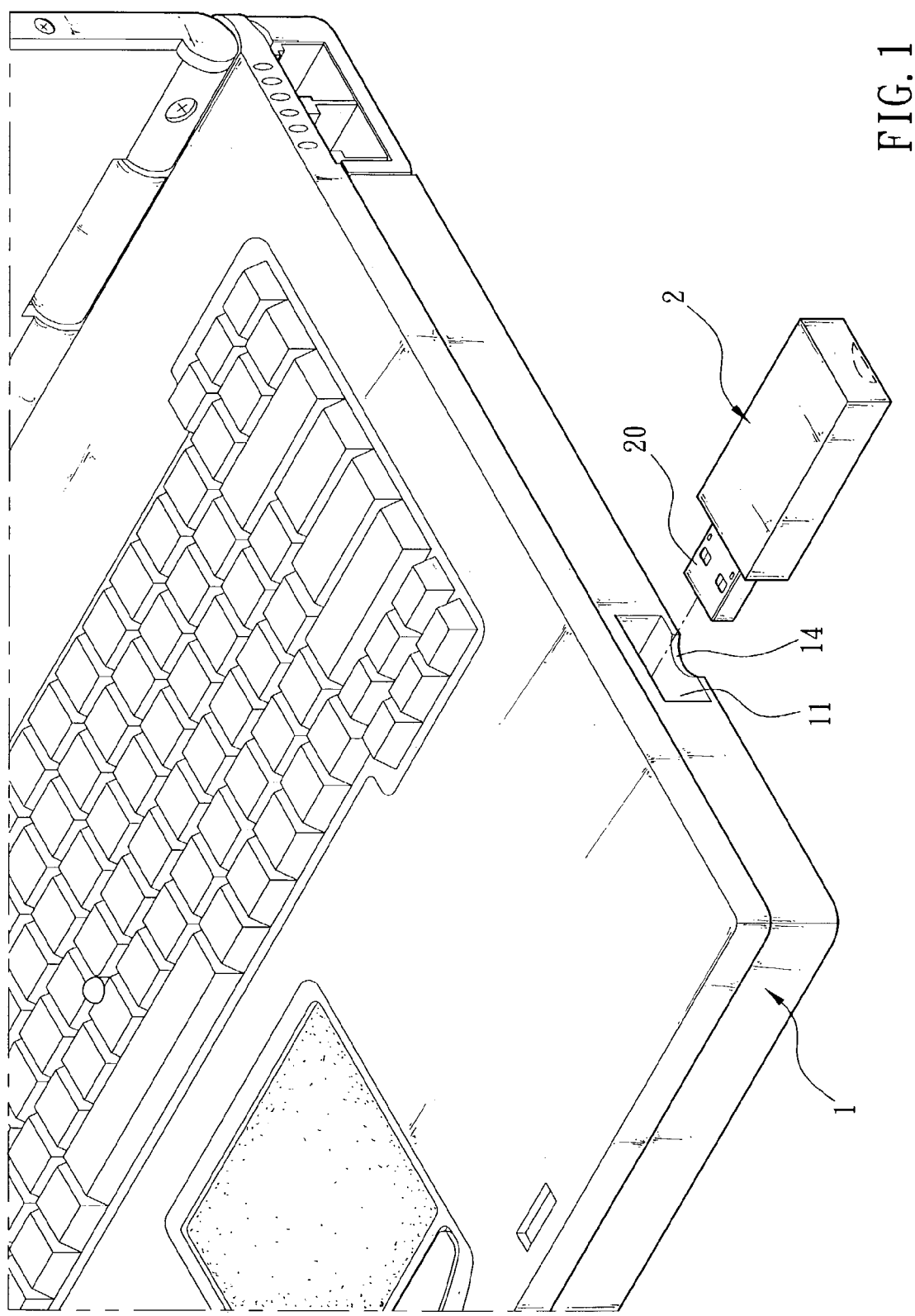
FIG. 1 is a perspective view of a computer capable of receiving a removable data storage device by insertion according to a first preferred embodiment of the invention.
Figure 2:
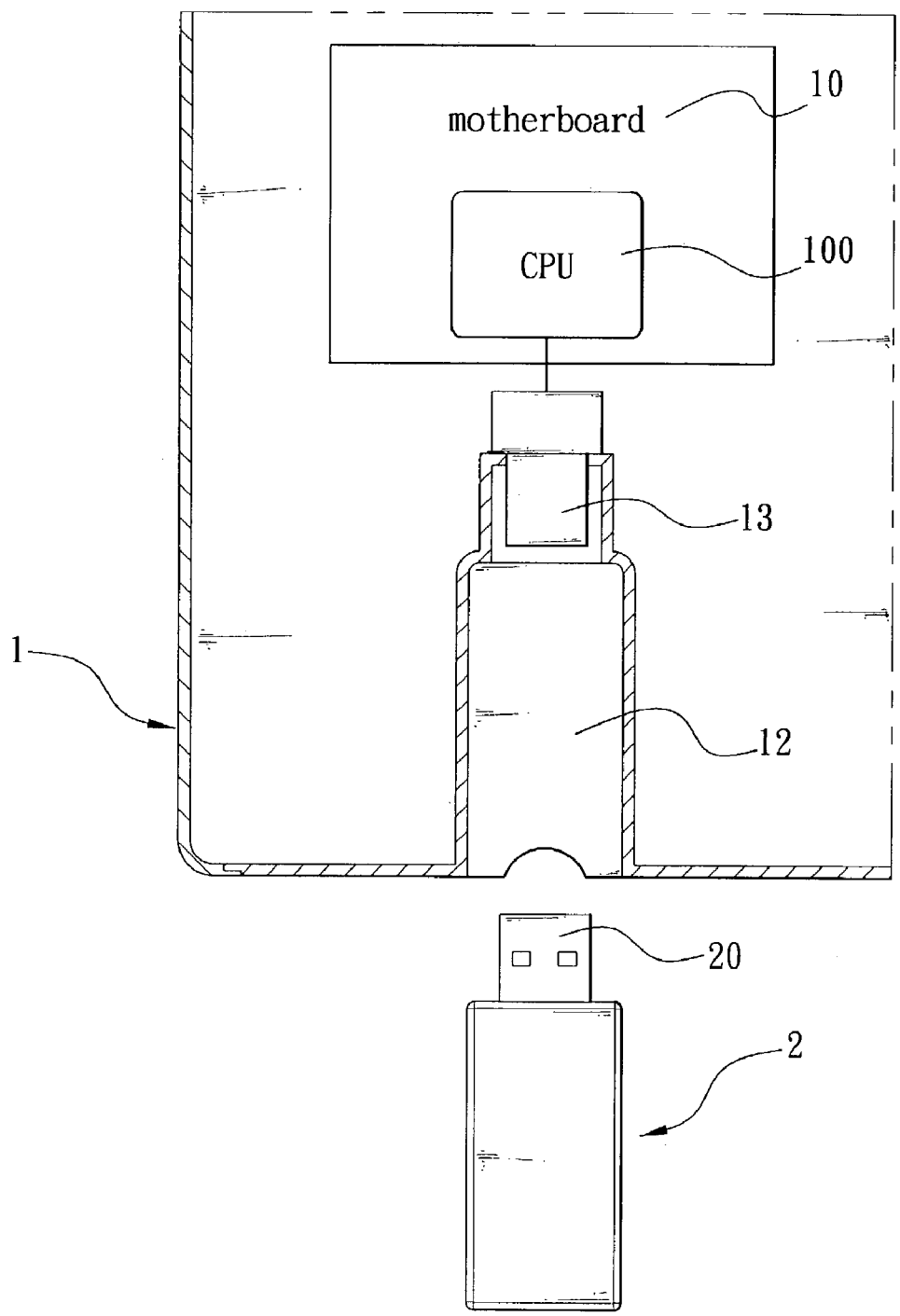
FIG. 2 is an enlarged plan view showing the components of the mechanism and other computer components.

Referring to FIGS. 1 and 2, there is shown a computer (e.g., notebook computer, desktop computer, etc.) for receiving a removable data storage device (e.g., micro drive 2 ) in accordance with a first preferred embodiment of the invention. The computer is enclosed in a case 1 and has a motherboard 10 in the case 1. At least one substantially rectangular opening 11 is provided on the case 1. A slot 12 is provided within the opening 11 for communicating therewith. A USB port 13 electrically connected to the motherboard 10 is provided at the bottom of the slot 12 opposite to the opening 11. The slot 12 has a depth sufficient to allow the micro drive 2 to fully insert into from the opening 11. At this position, an I/O (input/output) port 20 of the micro drive 2 is connected to the USB port 13. As an end, a CPU (central processing unit) 100 on the motherboard 10 can read data from the micro drive 2 or write data into the micro drive 2 via the coupled USB port 13 and I/O port 20.

Referring to FIGS. 1 and 2 again, in the invention the computer's external appearance can be preserved when the micro drive 2 is fully inserted into the slot 12. For facilitating a removal of the inserted micro drive 2 an arcuate indentation 14 is formed at a lower side of the opening 11. As such, the finger(s) of a user can contact the micro drive 2 from the indentation 14 prior to applying an outward force to pull the micro drive 2 from the slot 12.

Figure 3:
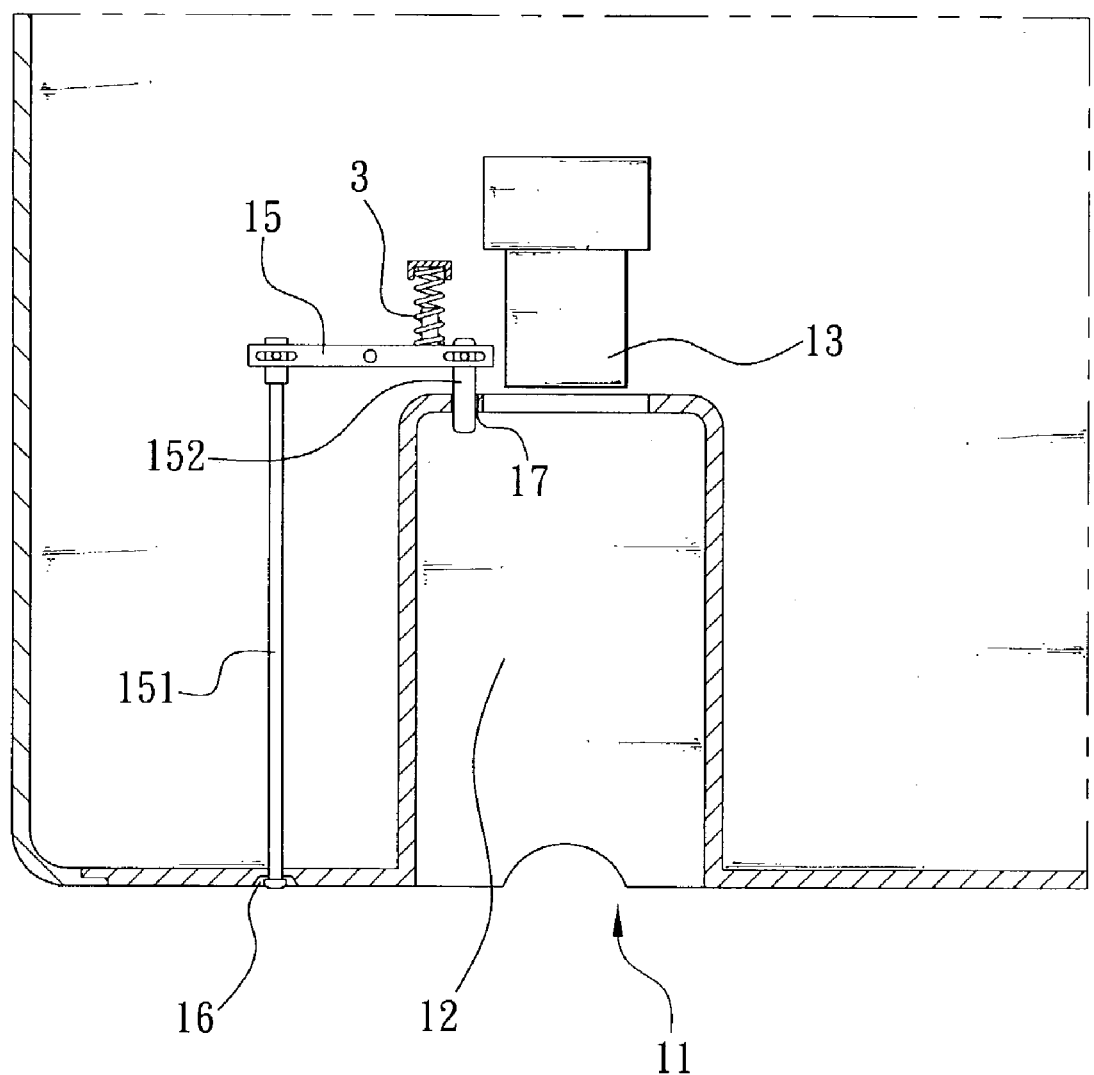
FIG. 3 is an enlarged plan view showing the components of the mechanism according to a second preferred embodiment of the invention.

Referring to FIG. 3 in conjunction with FIGS. 1 and 2, a configuration for further facilitating the removal of the micro drive 2 from the slot 12 is illustrated. Within the case 1, there is provided at least one lever 15 each pivotably connected to the case 1 at its center. One end of the lever 15 is pivotably connected to a first rod 151 which has an external end projected from a first aperture 16 adjacent the opening 11. The other end of the lever 15 is pivotably connected to a second rod 152 which is disposed adjacent the USB port 13 and is in a second aperture 17 inside the slot 12. A first elastic member 3 is provided proximate the other end of the lever 15 and opposite to the second rod 152. The second rod 152 is projected from the second aperture 17 when the micro drive 2 is not received in the slot 12.

By utilizing this, the micro drive 2 will push the second rod 152 to cause the first rod 151 to project from the first aperture 16 when the micro drive 2 has been inserted into the slot 12 to connect the I/O port 20 of the micro drive 2 and the USB port 13 together. For removing the micro drive 2, a user may push the first rod 151 to cause the second rod 152 to eject the micro drive 2. The I/O port 20 is then disconnected from the USB port 13. As an end, the micro drive 2 is projected from the opening 11 a sufficient length to permit the user to remove the micro drive 2 from the slot 12 easily.

Figure 4:
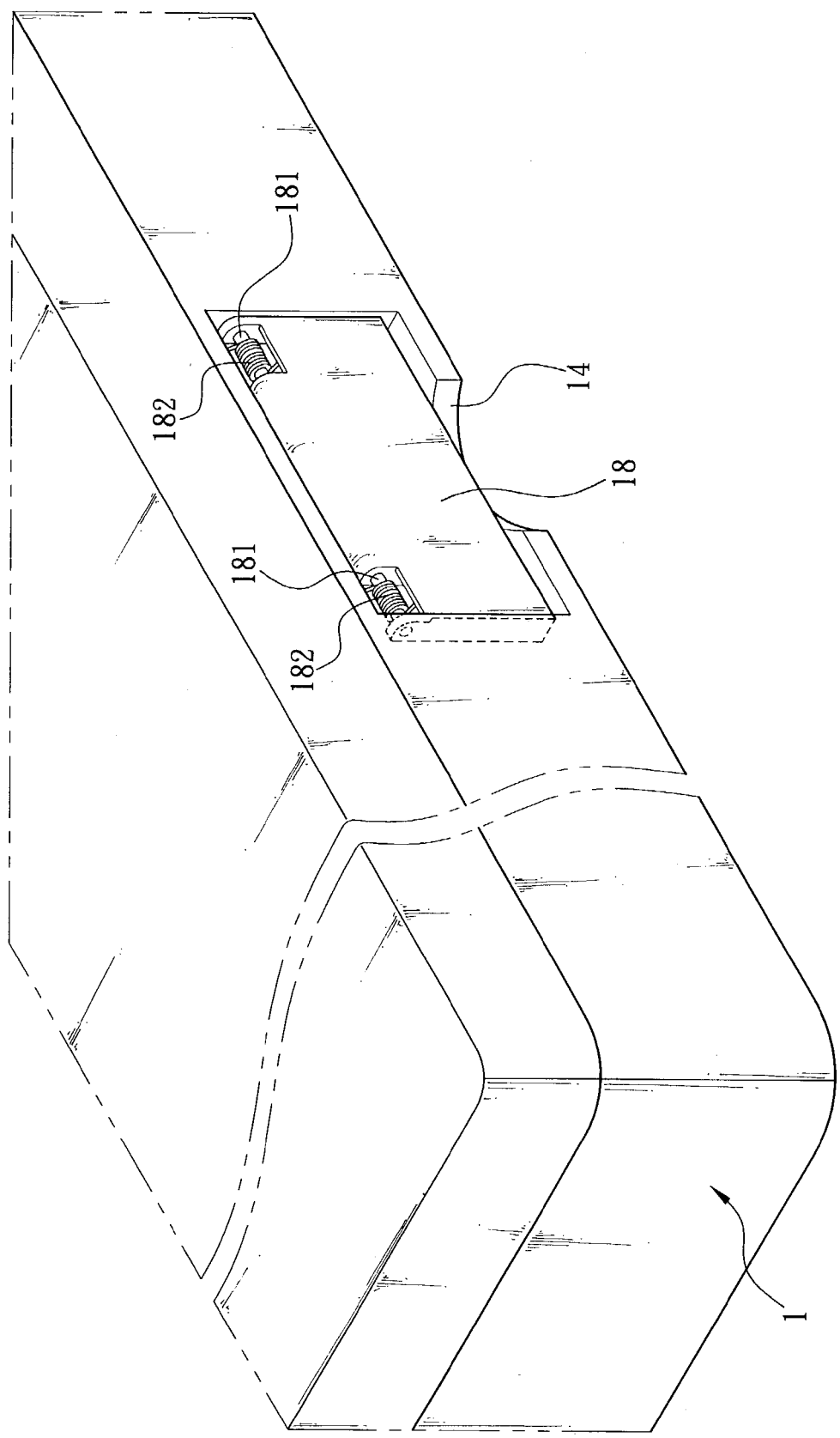
FIG. 4 is a perspective view of the mechanism mounted in the computer according to a third preferred embodiment of the invention.

Referring to FIG. 4 in conjunction with FIGS. 1 and 2, in the invention dust may fall into the slot 12 via the opening 11 when the micro drive 2 is not inserted into the slot 12. Hence, dust may accumulate on the USB port 13. Such dust accumulation may adversely affect a signal transmission and data transfer quality between the USB port 13 and the I/O port 20. For solving this problem, a substantially rectangular lid 18 is formed on the opening 11. A top side of the lid 18 is hingedly connected to an edge of the opening 11 by means of at least one pivot member (two are shown) 181. Also, at least one second elastic member (two are shown) 182 is formed between the top side of the lid 18 and the edge of the opening 11, i.e., substantially at the same position as the pivot member 181. In this embodiment, the second elastic member 182 is implemented as a spring. The lid 18 pivots about 90 degrees about the opening 11 to be parallel with the micro drive 2 which is inserted into the slot 12 from the opening 11 in which the second elastic member 182 is compressed. Once the micro drive 2 is removed from the slot 12, the lid 18 is pushed to its original position at the opening 11 by the stored elastic force of the second elastic member 182.

In brief, a micro drive has the advantages of compactness, portability, and large memory space for permitting a future expansion of a computer. As such, the micro drive can bring a lot of convenience to computer users. It is anticipated that the micro drives may even replace the widely used 3.5 inch floppy disks in a near future. It is seen that the micro drive 2 fully inserted into the slot 12 does not have a portion projected from the computer. Hence, the computer's external appearance is preserved. Also, the user or another person passing the computer may not contact the micro drive 2. As a result, the prior art drawback is avoided. The drawback is drop of the micro drive, damage of the micro drive, or interruption of data being transferred resulting in data loss or error. Hence, the invention can greatly benefit the vast consumers. Moreover, the invention enables a computer manufacture to overtake others in the competitive market by making the same.

While the invention has been described by means of specific embodiments, numerous modifications and variations could be made thereto by those skilled in the art without departing from the scope and spirit of the invention set forth in the claims.

What is claimed is:

1. A computer for receiving a removable data storage device comprising:
   a case including an internal motherboard and a CPU mounted on the motherboard;
   at least one substantially rectangular opening on the case;
   at least one slot each disposed within the opening for communicating therewith; and
   a USB port disposed at a bottom of the slot opposite to the opening, the USB port being electrically connected to the motherboard;
   wherein the data storage device is insertable into the slot via the opening, further comprising at least one lever in the case, each lever being pivotably connected to the case at its center, a first rod pivotably connected to one end of the lever, a first aperture adjacent the opening with an external end of the first rod projected therefrom, a second rod disposed adjacent the USB port, a second aperture inside the slot with a portion of the second rod disposed therein, and a first elastic member disposed proximate the other end of the lever and opposite to the second rod.

2. The computer of claim 1, wherein the first elastic member is a spring.

* * * * *